Aug. 9, 1960     E. O. KOLLMORGEN     2,948,188
TELESCOPE SIGHT
Filed Aug. 25, 1958
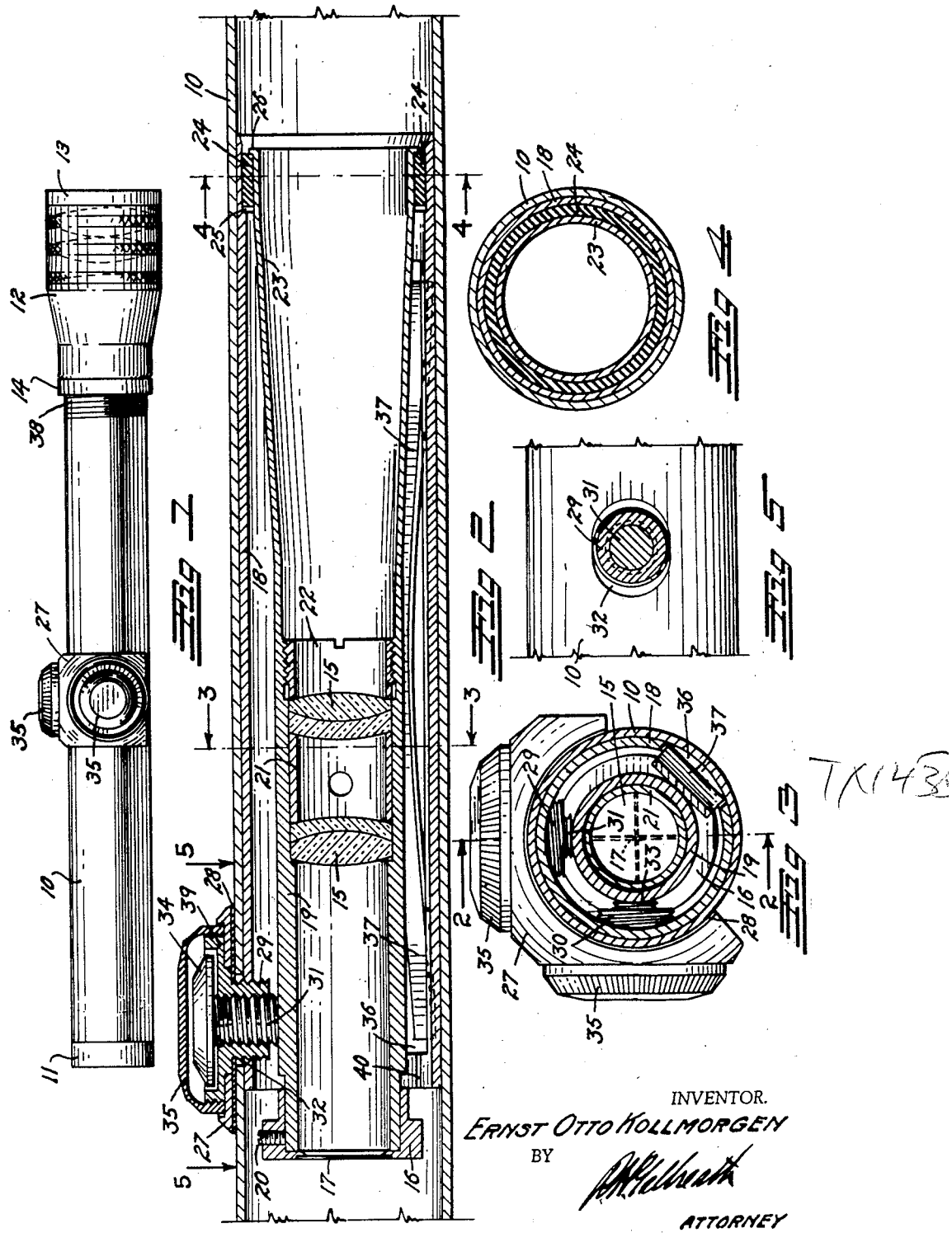
INVENTOR.
*Ernst Otto Kollmorgen*
BY
ATTORNEY

United States Patent Office 2,948,188
Patented Aug. 9, 1960

2,948,188

TELESCOPE SIGHT

Ernst Otto Kollmorgen, Amherst, Mass., assignor, by mesne assignments, to Redfield Gun Sight Co., Denver, Colo., a Colorado limited partnership Filed Aug. 25, 1958, Ser. No. 756,937

5 Claims. (Cl. 88—32)

This invention relates to a telescopic gun sight, and has for its principal object the provision of a simple, economical, and highly efficient unit for adjustably supporting erector lenses and a sighting reticle in the barrel of a telescope gun sight. Many structures have been proposed for adjustably supporting a reticle in a sighting telescope, and various constructions have been used for supporting the erector lenses and reticle so that they may be adjusted for parallax. Present structures of this type are exceedingly complicated and expensive to manufacture and difficult to assemble, and many are prone to parallax displacement from recoil.

A further object of this invention is to provide an erector lens and reticle unit: which can be quickly and easily slid into position in the barrel; which can be quickly and easily secured in the proper parallax position in the barrel; which, after adjustment for parallax, will permanently maintain its adjusted position in the barrel; and which can be quickly, easily, and accurately adjusted for windage and elevation.

Another object of the invention is to provide an erector lens and reticle unit which will eliminate the necessity for attachment screws, multiple springs, and other mechanisms conventionally employed for this purpose, and to provide simple threaded bushings which will serve the double function of mounting the unit in the barrel and providing bushing devices for the lateral and vertical adjustments.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation, approximately three-fourths natural size, of the improved telescope sight;

Fig. 2 is an enlarged, fragmentary, longitudinal section of the mid-portion of the telescope sight of Fig. 1, taken on the line 2—2, Fig. 3;

Fig. 3 is a similarly enlarged cross-section taken on the line 3—3, Fig. 2;

Fig. 4 is a similar cross-section taken on the line 4—4, Fig. 2; and

Fig. 5 is a detail, fragmentary, horizontal section taken on the line 5—5, Fig. 2.

A conventional telescope sight barrel is illustrated at 10 provided at its forward extremity with the usual objective lens mount 11 containing objective lenses, and at its rear extremity with a conventional eye piece mount 12 in which the usual eye piece lenses are positioned in an eye lens mount 13. The eye piece mount 12 is threaded on the rear extremity of the barrel 10 by means of the usual focusing threads 38, and can be locked in focus by means of a locking ring 14.

The above-described elements are conventional on most telescope sights. This invention relates more particularly to a unit for mounting erector lenses, such as indicated at 15, and an annular reticle 16, provided with the usual sighting cross hairs 17, within the barrel 10. The improved unit is housed in an outer tube, which will be herein referred to as the parallax tube 18. An inner tube, which will be herein designated as the erector tube 19, is resiliently and concentrically supported within the parallax tube, and the reticle 16 is mounted on the forward extremity of the erector tube 19, and the erector lenses 15 are mounted within the erector tube 19 at the proper focal distance from the reticle 16. The erector lenses rest against a shoulder in the erector tube and are maintained in proper spaced relation therein by means of a spacing sleeve 21, and are secured in position therein by means of a threaded lens locking sleeve 22. The reticle 16 may be secured in place on the erector tube 19 in any desired manner, such as by means of a suitable set screw 20.

The rear portion of the erector tube 19 is diametrically flared, as shown at 23, to enlarge the rear extremity thereof so as to bring it into relatively close, concentric, spaced relation with the rear extremity of the parallax tube 18. The intervening annular space between the two is filled by means of a bonded rubber ring 24 which maintains the erector tube 19 resiliently and accurately in axial alignment with the parallax tube 18. The rubber ring 24 is vulcanized to the inner surface of the parallax tube and to the outer surface of the flared extremity of the erector tube 19 so as to securely, permanently, and resiliently maintain the erector tube 19 in a substantial axial alignment with the parallax tube 18.

A turret member 27, provided with a semi-cylindrical socket, extends partially about the barrel 10 adjacent the forward extremity of the erector tube 19. A suitable sealing gasket 28 is positioned between the turret member 17 and the barrel 10. An internally and externally threaded spindle bushing 29 extends radially downward through the turret member 27, through a bushing opening 32 in the barrel 10, and is threaded through the upper wall of the parallax tube 18. A similar bushing 30 extends horizontally and radially through the turret member 27, through a second similar bushing opening in the barrel 10, and is threaded through the side wall of the parallax tube 18. The bushing openings 32 are longitudinally elongated, as shown in Fig. 5, to allow longitudinal adjustment of the unit in the barrel. The bushings are each provided with an enlarged socketed head 39 which, when the bushings are tightened into the threads in the wall of the parallax tube 18, serve to clamp the turret member radially inward, and simultaneously clamp the parallax tube 18 radially outward, so as to sandwich the wall of the barrel 10 therebetween.

An elevation adjusting screw 31 is threaded vertically and axially downward through th upper turret bushing 29, and a similar windage adjusting screw 33 is similarly threaded through the side spindle bushing 30. Both of the screws 31 and 33 are arranged to contact the erector tube 19 at a 90° spacing, and both are provided with any of the conventional index head structures 34 by means of which they may be accurately rotated to desired positions. For protection, the heads 34 are covered by means of suitable caps 35 which are threaded upon peripheries of the bushing heads 39.

An elongated, longitudinally extending spring opening 36 is formed in the wall of the parallax tube 18 at a point opposite to and intermediate the screws 31 and 33, and at 135° from each screw, as shown in Fig. 3. An elongated, bowed, leaf spring 37 is positioned in the spring opening 36 and acts to constantly urge the forward extremity of the erector tube 19 toward, and uniformly against, the extremities of the screws 31 and 33.

The unit is assembled by chemically cleaning the inner wall of the parallax tube and the other wall of the erector tube. The rear extremity of the erector tube 19 is covered with uncured rubber, and the tubes are forced together to cause the rubber to enter into a shouldered socket 25 formed in the rear extremity of the parallax tube. A flange 26 on the erector tube assists in forcing the rubber into the socket 25. the two tubes are then locked in concentric relation and subjected to the proper temperatures to cure the rubber into the form of the annular rubber ring 24 and to permanently bond the rubber with the contacting metallic wall surfaces.

The improved bonded unit is then assembled in the barrel 10 as follows. The forward extremity of the spring 37 is positioned in the forward extremity of the spring opening 36, and the parallax tube 18 is inserted in one extremity of the barrel 10. As the parallax tube 18 enters the barrel, the rear extremity of the spring 37 will be resiliently flexed toward the erector tube 19 and into the spring opening 36 so as to exert a sideward bias against the tube 19 and against the barrel 10. When the parallax tube 18 has reached its proper place in the barrel, the turret member 27 is slid over the barrel into register with the bushing openings 32 and the two spindle bushings are inserted through the turret member 27 and the bushing openings 32, and are threaded into and through the wall of the parallax tube 18, and the latter is adjusted forwardly and backwardly until the reticle is brought into the focal plane of the objective lens so as to eliminate parallax when a distant object is viewed. The bushings 29 and 30 are then tightened to permanently fix the parallax tube 18 in place. The latter tube is split at its rear extremity, as indicated at 40, to allow it to be expanded outwardly against the inner circumference of the barrel by the tension of the spindle bushings so as to increase the friction between the barrel 10 and the parallax tube 18 and the turret member 27, and to provide a close fit between the tubes.

The axial position of the sighting cross hairs 17 is adjusted to provide the proper range elevation and sideward windage adjustment by adjustment of the screws 31 and 33, which act against the opposing bias of the spring 37. The resilient welded rubber ring 24 allows free movement of the rear extremity of the erector tube 19 without lost motion. No screws or other attachment means are necessary for the erector lenses 15, the reticle 16, or the turret member 27, as the spindle bushings 29 and 30 serve a double purpose: that of locking the entire unit in place, and providing threaded bushings for the adjustment screws 31 and 33.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A unit for supporting erector lenses and a reticle in the tubular barrel of a sighting telescope comprising: a parallax tube adapted to be positioned in said barrel; an erector tube of smaller diameter than said parallax tube positioned within the latter, said parallax tube and said erector tube being susbtantially coextensive in length, said erector lenses and said reticle being mounted in said erector tube; means resiliently securing said tubes together at one extremity; resilient means urging the other extremity of said erector tube in a lateral direction; and screw means contacting said other extremity and acting to guide and limit the said lateral direction, said means for reseiliently securing the extremities of said tubes together at one extremity comprising an annular layer of resilient material bonded to and between said latter extremities.

2. A unit as described in claim 1 in which the resilient means urging said erector tube comprises an elongated, bowed leaf spring positioned in a spring opening in said parallax tube and arranged to exert a radial bias between said erector tube and said barrel.

3. A unit as described in claim 2 having headed threaded bushings threaded through the wall of said parallax tube, said bushings being adapted to extend through the wall of said barrel so that when said bushings are threaded into said parallax tube the barrel will be gripped between the parallax tube and the heads of said bushings to prevent longitudinal movement of said unit.

4. In a sighting telescope of the type having a tubular barrel with objective lenses at one extremity of said barrel and eye piece lenses at the other extremity thereof, means for supporting erector lenses and a reticle within said tubular barrel comprising: a parallax tube slidably fitted within said barrel; a turret member fitted about said barrel; a pair of headed threaded bushings extending radially inward through said turret member and through bushing openings in said barrel and being threaded into said parallax tube so that, when tightened, they will cause the barrel to be gripped between the turret member and the parallax tube; an erector tube of smaller diameter than said parallax tube and substantially of the same length positioned within and extending longitudinally of the latter; attachment means resiliently securing the rear extremities of both tubes together to form a unitary assembly; an adjusting screw threaded axially through each bushing into contact with said erector tube adjacent its forward extremity; and resilient means urging said latter extremity against said adjusting screws, said attachment means securing the rear extremities of said tubes together comprising an annular layer of rubber positioned between the rear extremities of said tubes, said rubber being vulcanized to both tubes.

5. Means for supporting erector lenses and a reticle within a tubular telescope barrel as described in claim 4 in which the resilient means urging said erector tube comprises an elongated, longitudinally-extending leaf spring positioned in a longitudinally-extending spring opening in said parallax tube and acting to exert a radially acting pressure between said erector tube and the inner face of the wall of said barrel.

References Cited in the file of this patent
UNITED STATES PATENTS

| | | |
|---|---|---|
| 915,274 | Day | Mar. 16, 1909 |
| 2,180,184 | Weaver | Nov. 14, 1939 |
| 2,189,766 | Unertl | Feb. 13, 1940 |
| 2,517,170 | Bernard | Aug. 1, 1950 |
| 2,627,659 | Murr | Feb. 10, 1953 |
| 2,858,732 | Kollmorgen et al. | Nov. 4, 1958 |

FOREIGN PATENTS

| | | |
|---|---|---|
| 1,062,643 | France | Dec. 9, 1953 |